(12) United States Patent
Huang et al.

(10) Patent No.: US 8,919,972 B2
(45) Date of Patent: Dec. 30, 2014

(54) OPTICAL ELEMENT ADJUSTMENT MECHANISM

(75) Inventors: Po-Hsuan Huang, Hsinchu (TW); Yu-Cheng Cheng, Hsinchu (TW)

(73) Assignee: National Applied Research Laboratories, Taipei (TW)

( * ) Notice: Subject to any disclaimer, the term of this patent is extended or adjusted under 35 U.S.C. 154(b) by 487 days.

(21) Appl. No.: 13/343,907

(22) Filed: Jan. 5, 2012

(65) Prior Publication Data

US 2013/0088793 A1 Apr. 11, 2013

(30) Foreign Application Priority Data

Oct. 5, 2011 (TW) .............................. 100136001 A (51) Int. Cl.
*G02B 5/08* (2006.01)
*G02B 7/182* (2006.01)

(52) U.S. Cl.
CPC .................................. *G02B 7/1825* (2013.01)
USPC ............................ 359/838; 248/479; 359/872

(58) Field of Classification Search
CPC ............... G02B 7/1825; B60R 1/072
USPC ....................... 248/479; 359/872, 871, 879
See application file for complete search history.

(56) References Cited

U.S. PATENT DOCUMENTS

| | | | | |
|---|---|---|---|---|
| 5,042,932 A * | 8/1991 | Pent | ................................ | 359/874 |
| 6,168,279 B1 * | 1/2001 | Schnell | ........................... | 359/872 |
| 6,386,719 B1 * | 5/2002 | Lee | .................................. | 359/879 |
| 6,637,902 B2 * | 10/2003 | Ishigami | ........................ | 359/876 |
| 6,871,968 B2 * | 3/2005 | Wachi | ............................. | 359/606 |
| 6,899,439 B2 * | 5/2005 | Mendoza Vicioso | .......... | 359/877 |
| 6,955,494 B2 * | 10/2005 | Kaneko | ........................ | 403/374.1 |
| 6,971,757 B2 * | 12/2005 | Ro | .................................. | 359/879 |
| 7,433,106 B2 * | 10/2008 | Kim | ............................ | 359/196.1 |
| 7,645,044 B2 * | 1/2010 | Lee | ................................. | 359/876 |
| 8,210,696 B2 * | 7/2012 | Huang | ............................ | 359/872 |
| 2012/0014008 A1 * | 1/2012 | Snegg | ............................. | 359/872 |

* cited by examiner

*Primary Examiner* — Terrell McKinnon
*Assistant Examiner* — Daniel Breslin
(74) *Attorney, Agent, or Firm* — Muncy, Geissler, Olds & Lowe, P.C.

(57) ABSTRACT

An optical element adjustment mechanism is for loading a reflection optical device, which comprises a base and a loading element. The base is movably assembled to the reflection optical device. The base is a hollow tubular structure, and each side has an opening. The inner edge of one of the opening has a plurality loading surfaces extension to the central side, and two leaning surfaces protruded along a tube wall of the base. The loading element movably assembled to the base has a first surface, a second surface and two datum planes. The first surface is flattened against the plurality loading surfaces. The second surface has a connecting portion connected the optical element. The two datum planes are respectively flattened against the two loading surfaces. Wherein, at least one adjustment gasket is moveably assembled between the base and the loading element for precision adjustment.

12 Claims, 9 Drawing Sheets

OPTICAL ELEMENT ADJUSTMENT MECHANISM

CROSS-REFERENCE TO RELATED APPLICATION

This application claims the benefit of Taiwan Patent Application No. 100136001, filed on Oct. 5, 2011, in the Taiwan Intellectual Property Office of the Republic of China, the disclosure of which is incorporated herein in its entirety by reference.

BACKGROUND OF THE INVENTION

1. Field of the Invention

The present invention relates to an adjustment mechanism, and more particularly to an optical element adjustment mechanism having high precision, high positioning capability and high vibration resistance.

2. Description of the Related Art

The artificial satellite telemeter is mainly used to obtain earth surface image data for environment monitoring, farming and forestry planning, disaster assessment and science research. The size and relative position of optical elements inside the payload structure must be maintained to prevent from influence from external environment in order to ensure the quality of images captured at a distance. Therefore, excellent structural requirement is important for the artificial satellite telemeter. Since an adjustment mechanism of optical elements in a reflection telescope structure of the preload of the satellite telemeter (e.g. secondary mirrors) is used to perform precisely optical calibration and adjustment and the structure thereof also receives strong vibration and high acceleration impacts (for example, a rocket equipped with the structures is launched), an optical element adjustment mechanism has been an important research issue of aerospace industry.

Currently, available technologies or an optical adjustment mechanism applied in a lab adapts precision screws to achieve precise adjustment. However, the threads of a screw for precise adjustment are usually smaller than a common screw in order to achieve precise adjustment. The strong caused by rocket launched leads to a series problem for stability of the relative position between the optical elements because of tiny threads of the screws for the optical adjustment mechanism. Therefore, how to improve vibration resistance, precision and positioning capability is an important issue.

In view of the aforementioned technique, the inventor of the present invention designed an optical element adjustment mechanism to overcome the deficiency of the present technique and improve the practical applicability of the industry.

SUMMARY OF THE INVENTION

In view of the shortcomings of the prior art, a principle of objective for the present invention is to overcome insufficient vibration resistance in prior arts by providing an optical element adjustment mechanism.

To achieve the foregoing objective of the invention, an optical element adjustment mechanism is applied in loading a reflection optical device, including a base and a loading element. The base is movably assembled to the reflection optical device and is a hollow tubular structure, and two sides of the hollow tubular structure respectively having an opening, wherein an inner edge of one opening is disposed with a plurality of loading surfaces stretching towered to a central side and two leaning surfaces protruded along a tube wall of the base, and the two leaning surfaces are planes and perpendicular to the plurality of loading surfaces.

The loading element is movably assembled to the base and has a first surface, a second surface and two datum planes. The first surface is flattened against the plurality of loading surfaces. The second surface is connected to a connection portion, and the connection portion is connected to the optical device. The two datum surfaces are disposed to a side wall of the loading element and perpendicular to the first surface and flattened against the two leaning surfaces, respectively, wherein at least one adjustment gasket is movably assembled between the base and the loading element to perform the precision adjustment.

The two leaning surfaces could be orthogonal to each other, and the two loading surfaces can be respectively parallel to the two datum planes.

The plurality of loading surfaces could be respectively disposed with a through hole. The loading element could be disposed with a plurality of bolting holes corresponding to the through hole and bolted by a bolt element respectively.

The at least one adjustment gasket could be individually or simultaneously placed between the first surface and the plurality of loading surfaces to perform the precision adjustment.

The at least one adjustment gasket is individually or simultaneously placed between the two leaning surfaces and the two datum planes to perform precision adjustment.

In addition, according to the objective of the present invention, an optical element adjustment mechanism is further provided and applied in loading a reflection optical device, including a base, a loading element and an adapting element. The base is movably assembled to the reflection optical device. The base is a hollow tubular structure, and two sides of the base respectively have an opening, and a peripheral edge of one of the openings is disposed with a plurality of loading surfaces stretching into a central side, and two leaning surfaces protruded along a tube wall. The two leaning surfaces are planes and perpendicular to the plurality of loading surfaces. The loading element has a first surface and a second surface. The first surface protrudes with a protrusion portion and has a top surface and two first datum planes. The top surface is perpendicular to the two first datum planes. The two first datum planes are disposed to a side wall of the protrusion portion. The second surface is disposed with a connection portion. The optical element is connected by the connection portion.

The adapting element is movably assembled to the base and has a third surface, a fourth surface and two second datum planes. The third surface is flattened against the plurality of loading surfaces and perpendicular to the two second datum planes. The fourth surface is disposed with a notch corresponding to the protrusion portion. A side wall of the notch is disposed with two first leaning surfaces. The protrusion portion of the loading element is inserted into the notch, and the two first datum planes are flattened against the two first leaning surfaces. The top surface is flattened against a bottom surface of the notch to movably assemble to the adapting element. The two second datum planes are disposed to the side wall of the adapting element and flattened against the two leaning surfaces, respectively, wherein the adapting element and the base perform precision adjustment by movably assembling at least one adjustment gasket.

The two second datum planes are respectively parallel to the two leaning surfaces, and the third surface is parallel to the plurality of loading surfaces.

The two first datum planes are respectively parallel to the two first leaning surfaces, and the top surface is parallel to the bottom surface of the notch.

The plurality of loading surfaces are respectively disposed with a first through hole, and the adapting element is disposed with a plurality of first bolting holes corresponding to the first through hole and bolted by a bolt element.

The adapting element is disposed with a plurality of second bolting holes corresponding to the two first leaning surfaces and bolted by a bolt element respectively such that the loading element would tightly lean against the two first leaning surfaces of the adapting element.

The notch is disposed with a plurality of second through holes, and the protrusion portion of the loading element is disposed with a plurality of third bolting holes corresponding to the plurality of second through holes and bolted by the bolt element respectively.

The at least one adjustment gasket is individually or simultaneously placed between the third surface and the plurality of loading surfaces.

The at least one adjustment gasket is individually or simultaneously placed between the two leaning surfaces and the two second datum planes.

The optical element adjustment mechanism according to the invention has one or more advantages:

(1) The optical element adjustment mechanism would enhance the positioning capability through three mutually orthogonal surfaces during the assembly.

(2) The optical element adjustment mechanism would adjust inclination and de-center quantity by the precise adjustment gasket, thereby enhancing the precision of the optical element adjustment mechanism.

(3) The optical element adjustment mechanism could be assembled by normal bolt elements to enhance the vibration resistance of the optical element adjustment mechanism.

(4) The optical element and the loading element with high unit price of the optical element adjustment mechanism could be assembled or detached to prevent from being damaged due to the adjusting and processing operation.

DETAILED DESCRIPTION OF THE PREFERRED EMBODIMENTS

The foregoing and other technical characteristics of the present invention will become clear with the detailed description of the preferred embodiments and the illustration of the related drawings.

An optical element adjustment mechanism of the present invention is applicable to load a reflection optical device. A frequently used optical element is an axially symmetric optical element, and the axial direction of optical axis thereof is defined as Z-axis, and axial directions of X-axis and Y-axis are perpendicular to Z-axis. When the optical device is used to calibrate light path, the axial directions needing to be adjusted are the position translations of X-axis, Y-axis and Z-axis, and the tilting adjustment, which rotates optical element adjustment mechanism relative to X-axis and Y-axis.

Figure 1:
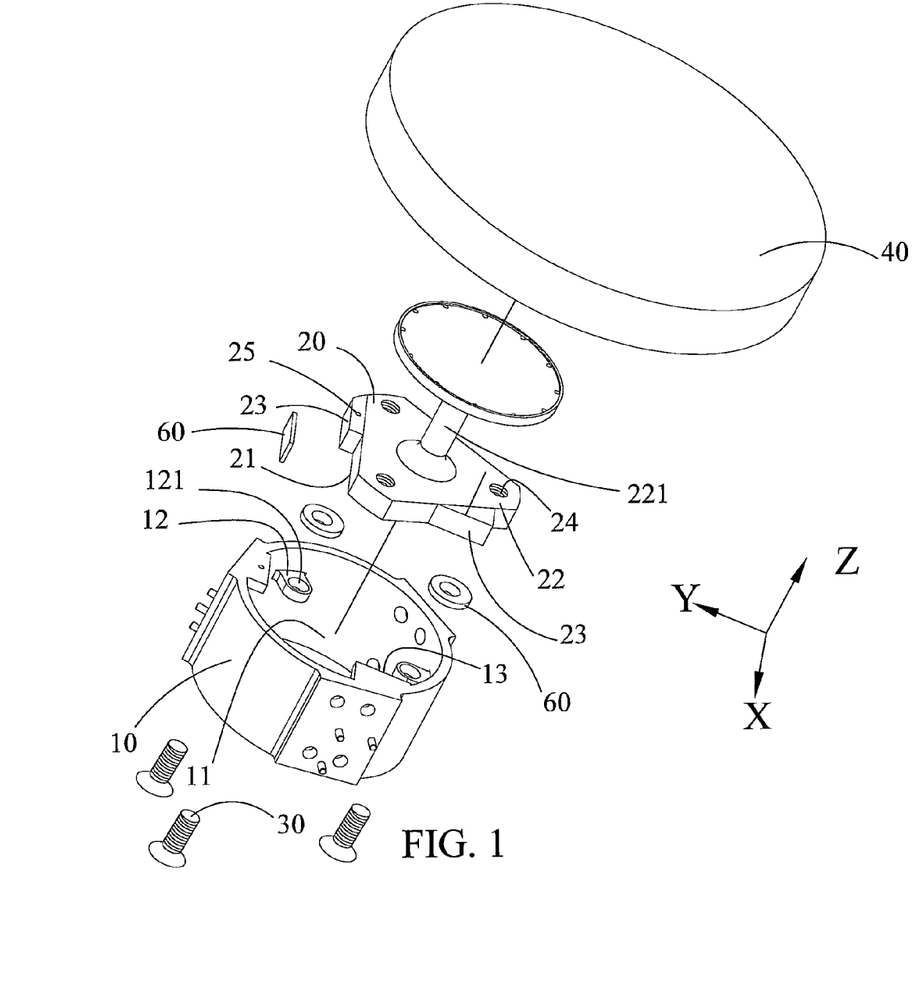
FIG. 1 is an exploded diagram of an optical element adjustment mechanism according to a first embodiment of the invention.
Figure 2:
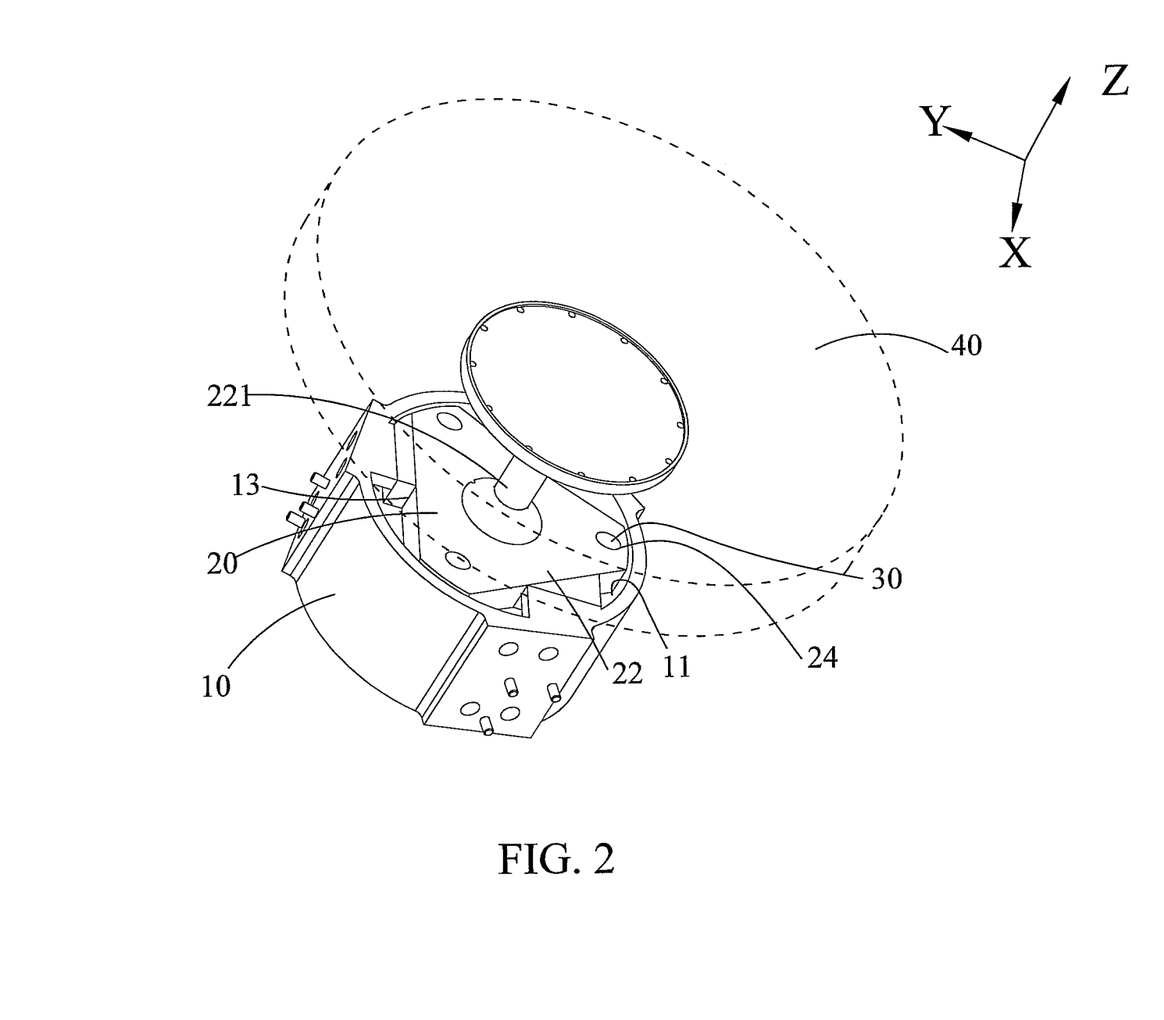
FIG. 2 is an assembly diagram of an optical element adjustment mechanism according to a first embodiment of the invention.

With reference to FIG. 1 and FIG. 2, FIG. 1 is an exploded diagram of an optical element adjustment mechanism according to a first embodiment of the invention; and FIG. 2 is an assembled drawing of an optical element adjustment mechanism according to a first embodiment of the invention. The optical element adjustment mechanism includes a base 10, and a loading element 20. The base 10 is movably assembled to a reflection optical device and is a hollow tubular structure with reduced weight. Two sides of the base 10 have an opening 11 respectively. An inner edge of one of the openings 11 is disposed with a plurality of loading surfaces 12 stretching out toward the center of the base, and two leaning surfaces 13 protruding along a tube wall of the base 10. The leaning surfaces are planes and perpendicular to the plurality of loading surfaces 12. The loading element 20 is movably assembled to the base 10 and has a first surface 21, a second surface 22 and two datum planes 23. The first surface 21 is flattened against the plurality of loading surfaces 12. The second surface 22 is disposed with a connection portion 221. Two datum planes 23 are disposed at a side wall of the loading element 20 and perpendicular to the first surface 21 and flattened against the two leaning surfaces 13, respectively, wherein quantity of the loading surfaces 12 could be varied upon actual design demands. In the embodiment, basically three loading surfaces 12 are, but not limited to, taken as an example.

Three loading surfaces 12 of the base 10 could be respectively disposed with a first through hole 121. The loading element 20 has three bolting holes 24 corresponding to the first through holes 121. When the loading element 20 is assembled to the base 10, the two datum planes 23 of the loading element 20 are flattened against the two leaning surfaces 13 of the base 10 first, and a bolt element 30 respectively passes through the through hole 121 of the base 10 to bolt the bolting holes 24 of the loading element 20. The bolt element 30 could be a screw or a set screw. In the embodiment, a common screw is, but not limited to, taken as an example. To increase the convenience of assembly, a recognition mark 25 is disposed to the loading element 20 to easily recognize the direction of assembling elements. When the base 10 and the loading element 20 are completely assembled, the optical element 40 could be assembled to the connection portion 221 of the second surface 22 of the loading element 20.

The present invention takes two leaning surfaces 13 orthogonal to each other as a datum plane, and the leaning surfaces 13 are orthogonal to the loading surfaces 12 to allow the two datum planes 23 and the first surface 21 to be flattened against the leaning surface to restrict the axial freedom of six axes (The position translation of X-axis, Y-axis and Z-axis, and the tilting adjustment which rotates optical element relative to X-axis, Y-axis and Z-axis) of the optical element adjustment mechanism. In this way, the relative position of the base 10 and the loading element 20 is always within an extremely small tolerance range after the loading element 20 is assembled to the base 10. Based on the precision positioning of the optical element adjustment mechanism, an adjustment gasket 60 could always be used to perform the precision adjustment of posture.

Figure 3:
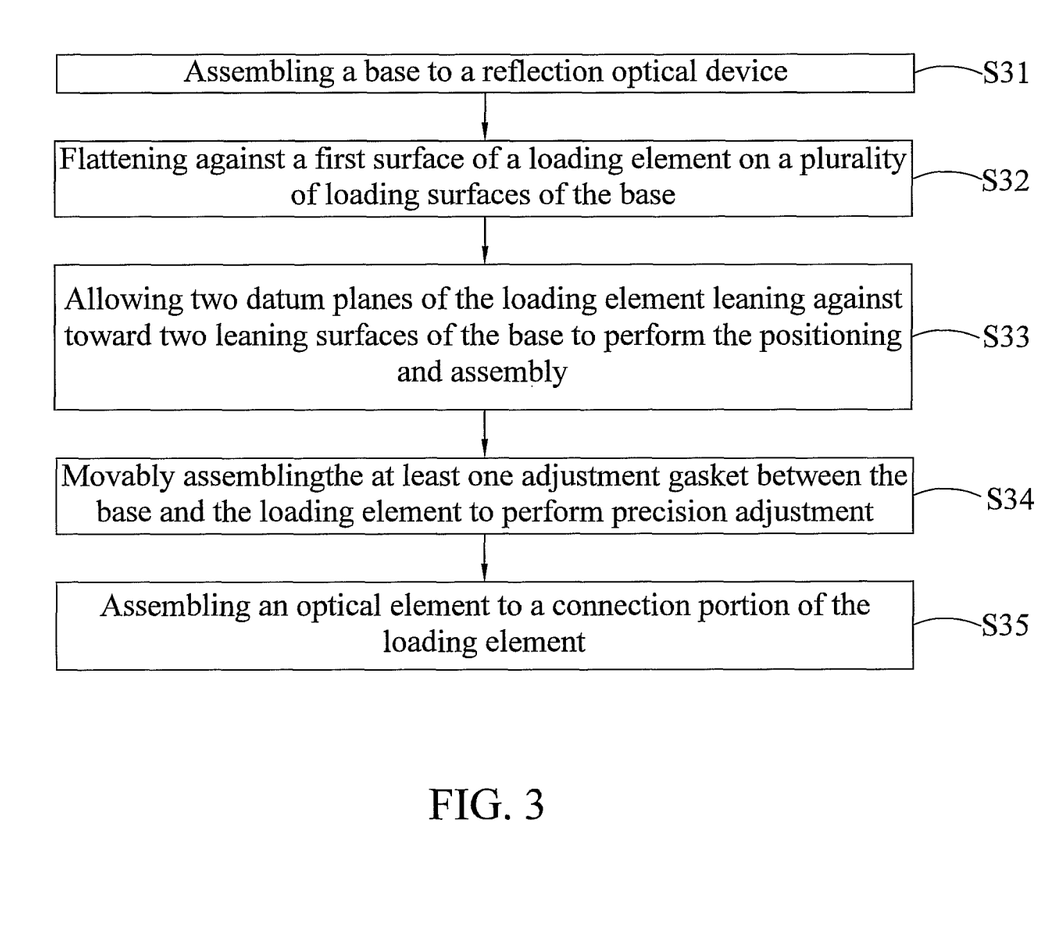
FIG. 3 is a flowchart of an optical element adjustment mechanism according to a first embodiment of the invention.

With reference to FIG. 3 for a flowchart of an optical element adjustment mechanism according to a first embodiment of the invention is depicted. As shown in the figure, the adjustment methods include the following steps:

(S31) Assembling a base to a reflection optical device;

(S32) Flattening against a first surface of a loading element against a plurality of loading surfaces of the base;

(S33) Allowing two datum planes of the loading element leaning against toward two leaning surfaces of the base to perform the positioning and assembly;

(S34) Movably assembling the at least one adjustment gasket between the base and the loading element to perform precision adjustment; and (S35) Assembling an optical element to a connection portion of the loading element.

The step (S33) is to allow the loading element leaning toward the base to restrict the freedom of Z-axis. In addition, the two datum planes of the loading element lean against the leaning surface of the base to restrict the freedom of X-axis and Y-axis. The tilt of X-axis, Y-axis and Z-axis are also simultaneously restricted. Since the freedom of six axes is restricted, the positioning between the elements could be achieved. Step (S32) is to place the adjustment gasket between the leaning surface and the datum planes or between the loading surface and the first surface. While performing the direction adjustment of X-axis, Y-axis or its combination, the adjustment gasket could be placed between the leaning surface and the datum planes to perform de-center adjustment using Z-axis as an axle. While the adjustment gaskets are placed between the loading surface and the first surface, tilt and the position adjustment of Z-axis are performed. When the thicknesses of the adjustment gaskets between the three loading surfaces and the first surface are identical, the position with respect to Z-axis is individually adjusted. Further, when thicknesses of the adjustment gasket between the three loading surfaces and the first surface are not identical, the inclination is adjusted.

While adjustment is performed, the bolt element is released to increase or reduce the thickness of the adjustment gaskets. After the adjustment, leaning toward the datum plane is utilized to set back to the original position, thereby achieving functions of positioning and precision adjustment. The thickness of the adjustment gasket can be determined by increasing or decreasing the number of the adjustment gasket, or changing the thickness of each adjustment gasket. The goal of reducing the thickness of the adjustment gasket could also be achieved by utilizing the precision processing (e.g. grinding).

Figure 4:
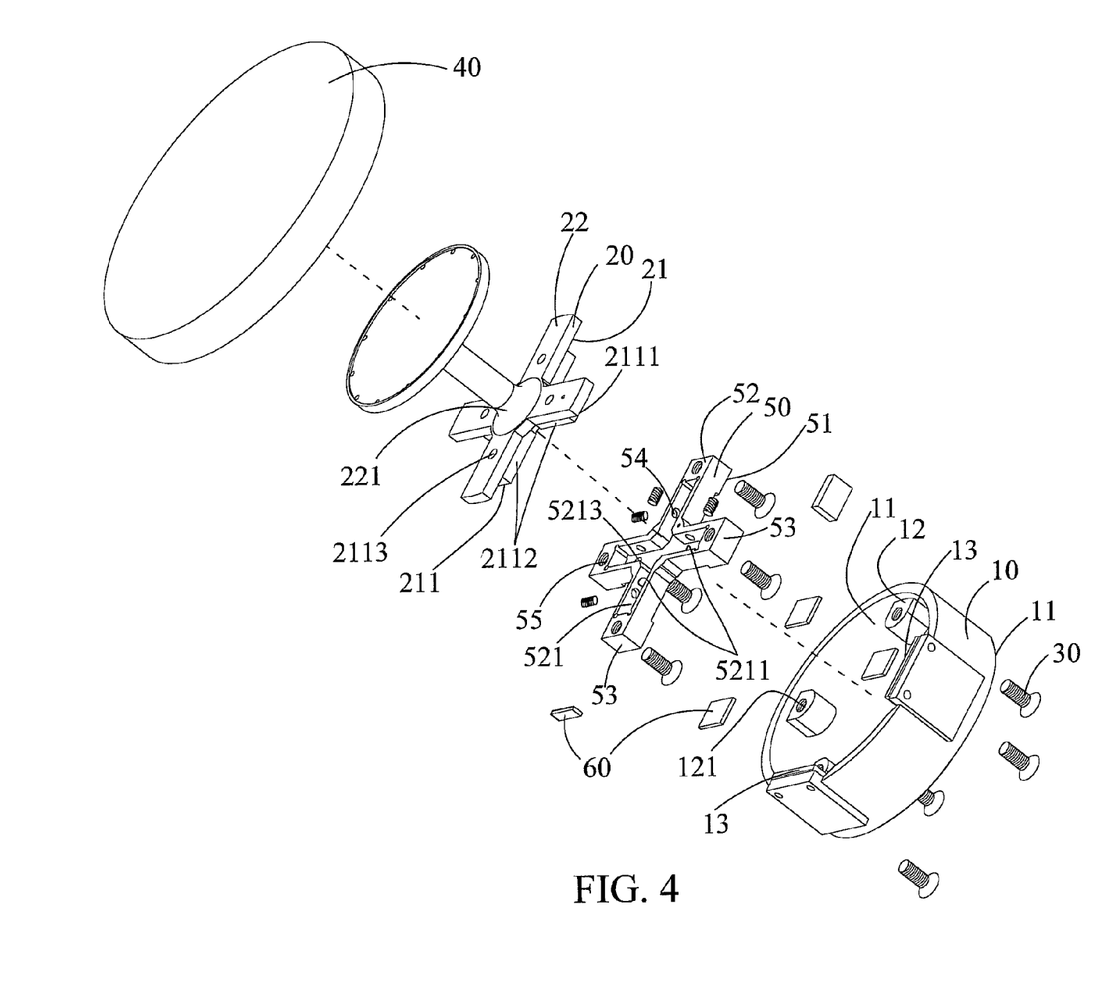
FIG. 4 is an exploded diagram of an optical element adjustment mechanism according to a second embodiment of the invention.
Figure 5:
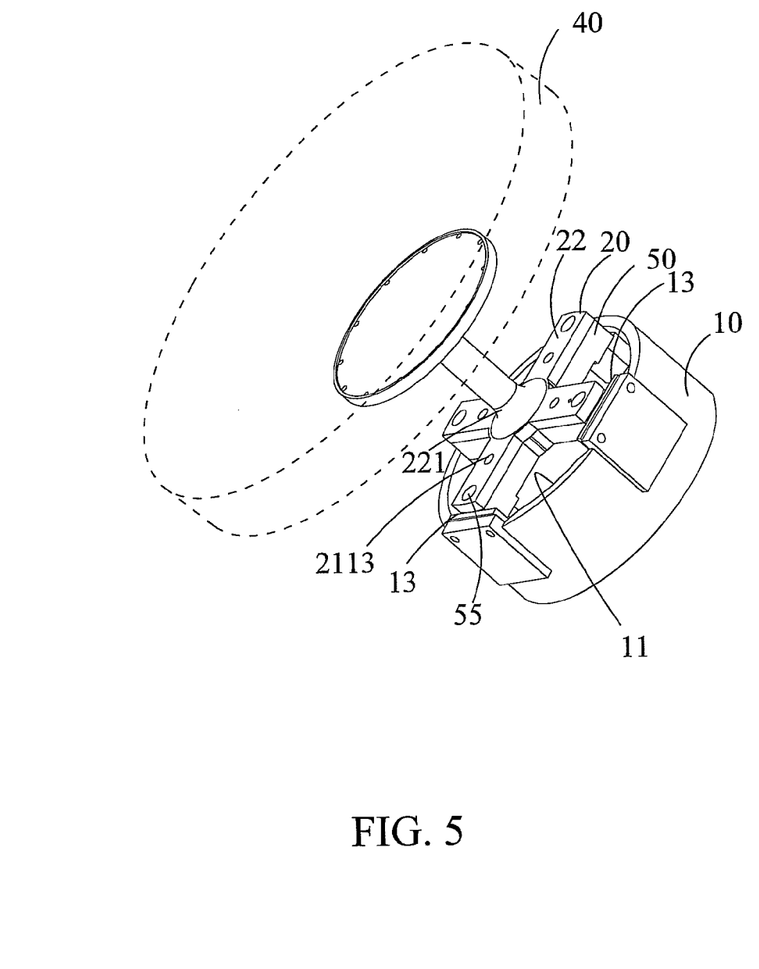
FIG. 5 is an assembly diagram of an optical element adjustment mechanism according to a second embodiment of the invention.
Figure 6:
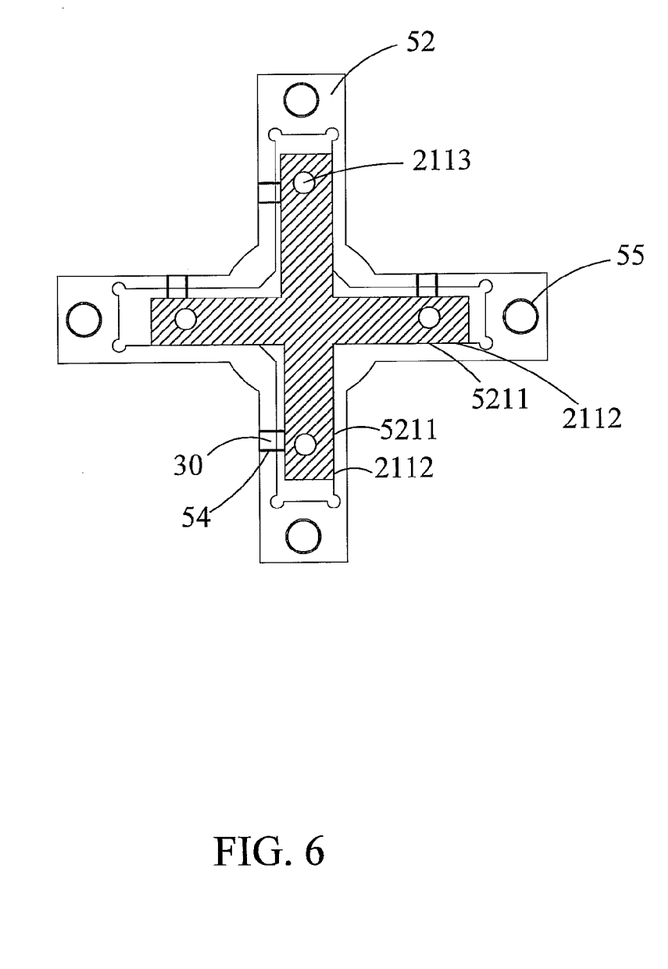
FIG. 6 is a front view of an optical element adjustment mechanism according to a second embodiment of the invention.

With reference to FIG. 4, FIG. 5 and FIG. 6, FIG. 4 is an exploded diagram of an optical element adjustment mechanism according to a second embodiment of the invention; FIG. 5 is an assembled drawing of an optical element adjustment mechanism according to a second embodiment of the invention; and FIG. 6 is a front view of an optical element adjustment mechanism according to a second embodiment of the invention. As shown in figures, the optical element adjustment mechanism includes a base 10, an adapting element 50 and a loading element 20. The base 10 is a circular case. Two sides of the case respectively have an opening 11. A peripheral side of one of the openings 11 of the case is protruded with a plurality of loading surfaces 12 and two leaning surfaces 13. The loading element 20 has a first surface 21 and a second surface 22. The first surface 21 is disposed with a protrusion portion 211 that has a top surface 2111 and two first datum planes 2112. The adapting element 50 could be a cross block having a third surface 51, a fourth surface 52 and two second datum planes 53, wherein the fourth surface 52 has a cross shaped notch 521. Two first leaning surfaces 5211 are disposed in the notch 521. The first leaning surface 5211 is a side wall of the notch 521. The shape of the notch 521 corresponds to the shape of the protrusion portion 211. The height of the protrusion portion 211 corresponds to the deep of the notch 521. The second datum plane 2112 is a side wall of the protrusion portion 521, wherein a number of the loading surface 12 could be changed upon actual design demands. In the embodiment, four loading surfaces 12 are, but not limited to, taken as an example.

With reference to FIG. 6, the loading element 20 tightly leans the first leaning surface 5211 through the first datum plane 2112, and the top surface 2111 smoothly and tightly abuts upon a bottom surface 5212 of the notch 521 to perform the positioning. The adapting element 50 has two second bolting holes 54 corresponding to the first leaning surfaces 5211. The bolt elements 30 are respectively locked into the second bolting holes 54 to allow the loading element 20 to complete the positioning on the adapting element 50. The notch 521 is disposed with a plurality of second through holes 5213. The protrusion portion 211 of the loading element 20 has three third bolting holes 2113 corresponding to the plurality of second through holes 2113 that is respectively bolted by the bolt elements 30.

Figure 7:
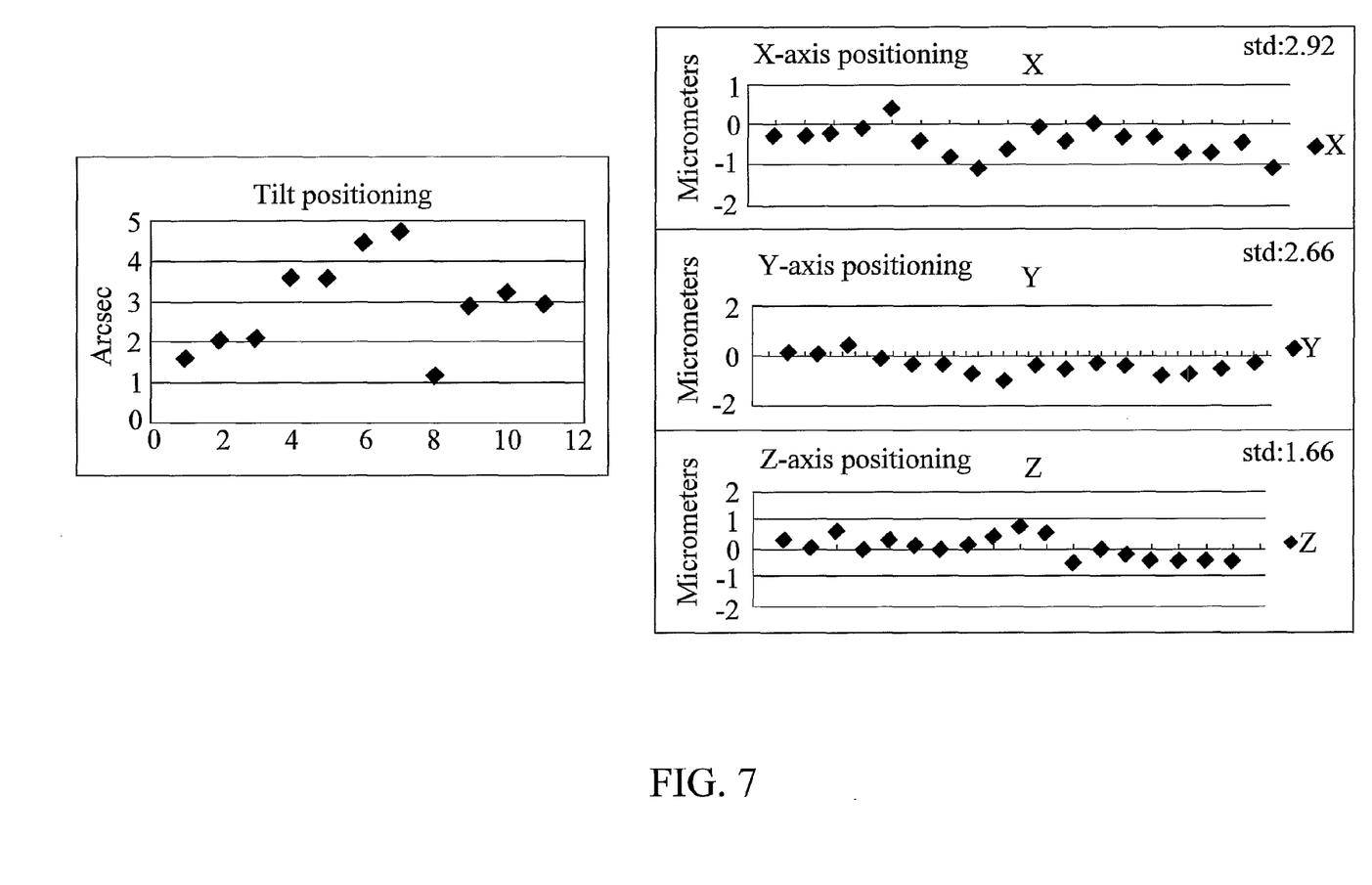
FIG. 7 is a schematic diagram of repeated positioning of the loading element and the adapting element of an optical element adjustment mechanism according to a second embodiment of the invention.

In an assembly relationship between the loading element 20 and the adapting element 50, since the two first leaning surfaces 5211 are orthogonal to each other and orthogonal to the bottom surface 5212 of the notch 521. The first datum planes 2112 are respectively parallel to the first leaning surfaces 5211. The top surface 2111 is parallel to the bottom surface 5212 of the notch 521 to restrict six axial freedom of degrees of the optical element adjustment mechanism, and the relative position of assembling the loading element 20 and the adapting element 50 each time is within an extremely small tolerance range (as shown in FIG. 7).

Figure 8:
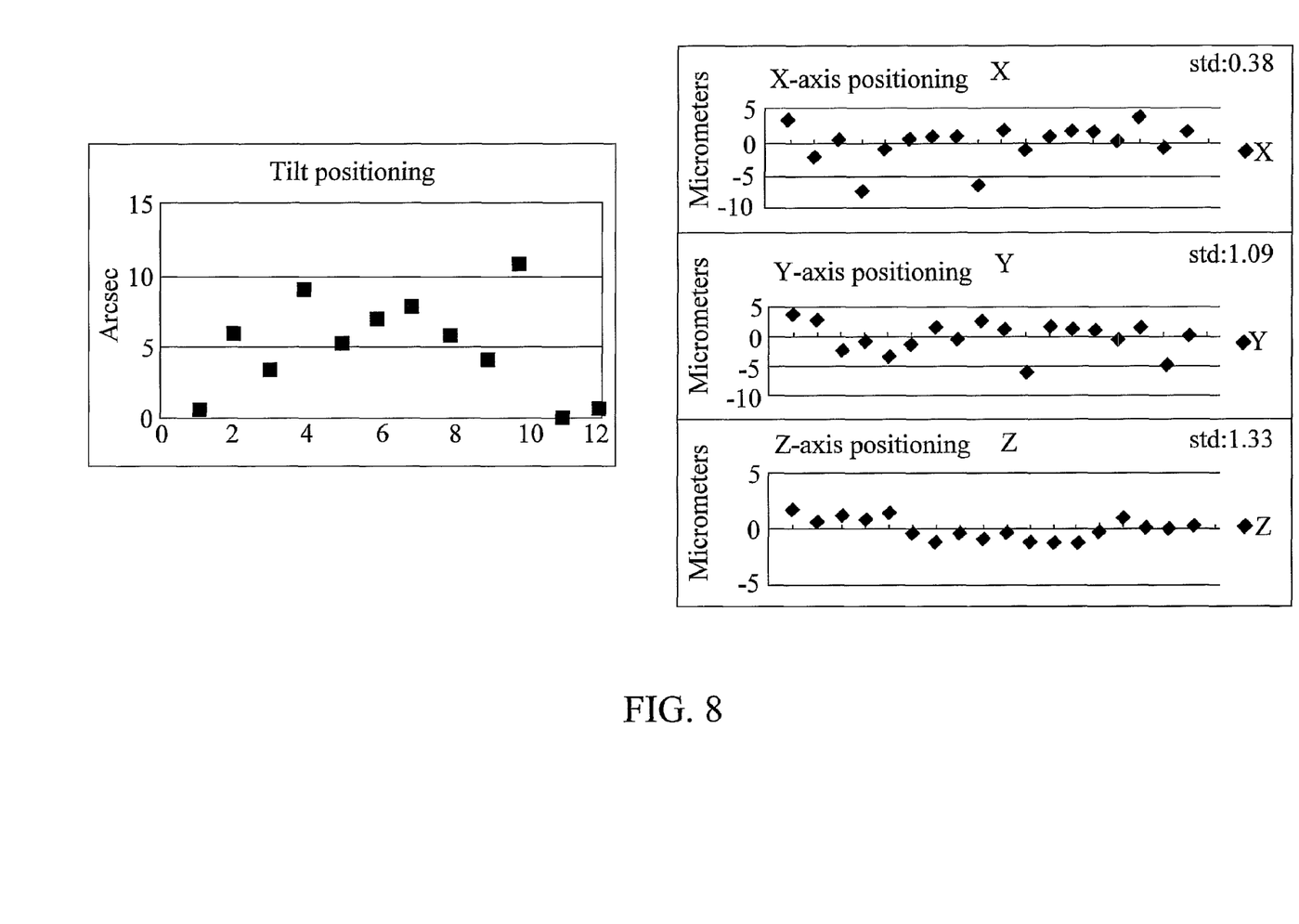
FIG. 8 is a schematic diagram of repeated positioning of the assembly members of the adapting element, the loading element and the base of an optical element adjustment mechanism according to a second embodiment of the invention.

The assembly for the assembly member of assembled loading element 20 and the adapting element 50 and the base 10 is similar to the assembly for the base 10 and the loading element 20 in the first embodiment, and there is no need to depict herein. The two leaning surfaces 13 of the base 10 are orthogonal to each other and then orthogonal to the four loading surfaces 12. The loading surfaces 12 are respectively disposed with a first through hole 121. The adapting element 50 is disposed with a plurality of first bolting holes 55 corresponding to the first through holes 121 and bolted by respective bolt element 30 to restrict six axial freedom of degrees of the optical element adjustment mechanism, and the relative positions of the assembly between the elements are within an extremely small tolerance range (as shown in FIG. 8). Based on the precision positioning of the optical element adjustment mechanism, the posture of precision adjustment could be performed by using the adjustment gaskets 60.

Figure 9:
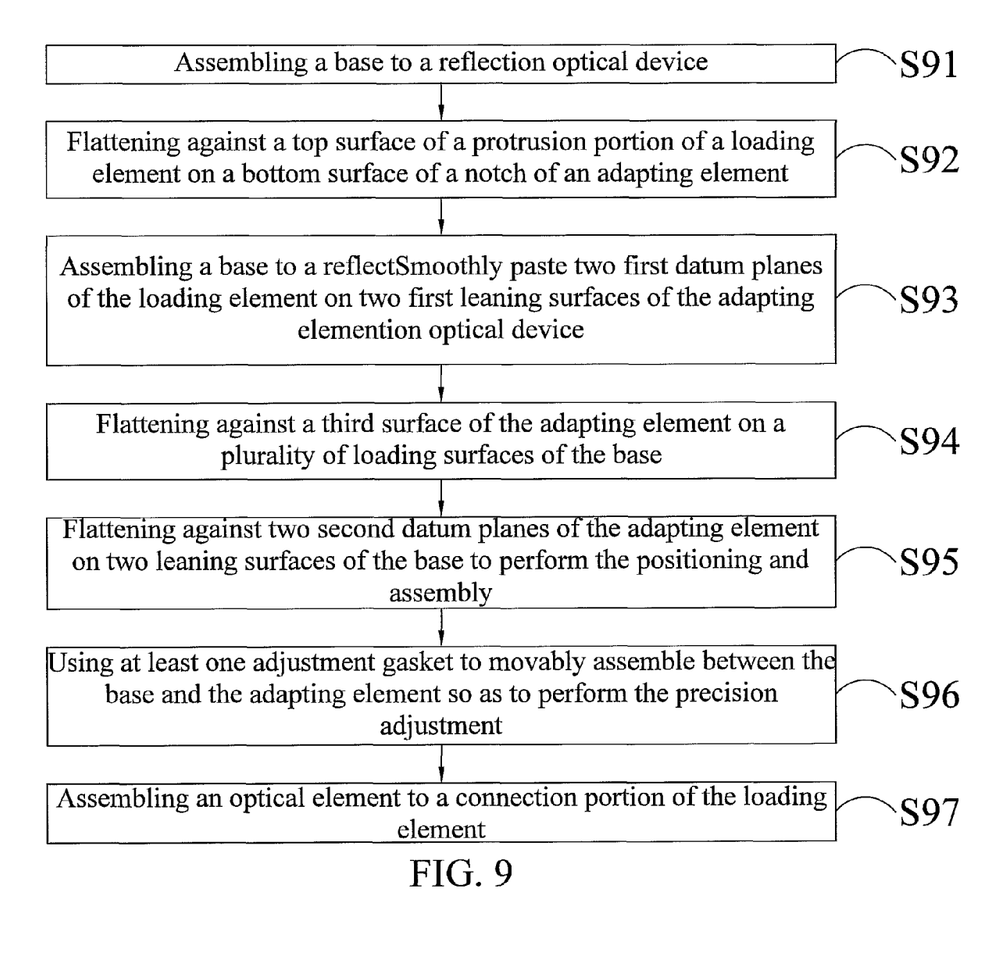
FIG. 9 is a flowchart of adjustment methods of an optical element adjustment mechanism according to a second embodiment of the invention.

With reference to FIG. 9 for a flowchart of adjustment methods for optical element adjustment mechanism according to a second embodiment of the invention is depicted. As shown in the figure, the adjustment methods include the following steps:

(S91) Assembling a base to a reflection optical device;

(S92) Flattening against a top surface of a protrusion portion of a loading element on a bottom surface of a notch of an adapting element;

(S93) Flattening against two first datum planes of the loading element on two first leaning surfaces of the adapting element;

(S94) Flattening against a third surface of the adapting element on a plurality of loading surfaces of the base;

(S95) Flattening against two second datum planes of the adapting element on two leaning surfaces of the base to perform the positioning and assembly;

(S96) Using at least one adjustment gasket to movably assemble between the base and the adapting element so as to perform the precision adjustment; and (S97) Assembling an optical element to a connection portion of the loading element.

The detail depiction of the adjustment method in the embodiment is not illustrated herein except the foregoing depiction since other implementations are similar to the first embodiment.

The invention improves over the prior art and complies with patent application requirements, and thus is duly filed for patent application. While the invention has been described by device of specific embodiments, numerous modifications and variations could be made thereto by those generally skilled in the art without departing from the scope and spirit of the invention set forth in the claims.

What is claimed is:

1. An optical element adjustment mechanism applicable to load a reflection optical device, the optical element regulation mechanism comprising:
a base movably assembled to the reflection optical device, the base being a hollow tubular structure, and each side of the base respectively having an opening, a plurality of loading surfaces disposed on an inner edge of one of the openings and stretching into a center of the base, and two leaning surfaces protruding along a tube wall of the base, the two leaning surfaces being plane and perpendicular to the plurality of loading surfaces; and
a loading element movably assembled to the base and having a first surface, a second surface and two datum planes, the first surface flattened against the plurality of loading surfaces, the second surface disposed with a connection portion, the connection portion connected to an optical element, the two datum planes disposed to a side wall of the loading element and being perpendicular to the first surface, the two datum planes flattened against the two leaning surfaces;
wherein at least one adjustment gasket is movably assembled between the base and the loading element to perform precision adjustment;
wherein the two leaning surfaces are perpendicular to each other, and the two loading surfaces are respectively parallel to the two datum surfaces.

2. The optical element adjustment mechanism as recited in claim 1, wherein the plurality of loading surfaces is respectively disposed with a first through hole, and the loading element is disposed with a plurality of bolting holes corresponding to the first through hole and bolted with a bolt element respectively.

3. The optical element adjustment mechanism as recited in claim 1, wherein the at least one adjustment gasket is individually or simultaneously placed between the first surface and the plurality of loading surfaces.

4. The optical element adjustment mechanism as recited in claim 1, wherein the at least one adjustment gasket is individually or simultaneously placed between the two leaning surfaces and the two datum planes.

5. An optical element adjustment mechanism applicable to load a reflection optical device, comprising:
a base movably assembled to the reflection optical device, the base being a hollow tubular structure, and two sides of the base respectively having an opening, an inner edge of one of the openings disposed with a plurality of loading surfaces stretching into a center of the base, and two leaning surfaces protruded along a tube wall of the base, the two leaning surfaces being plane and perpendicular to the plurality of loading surfaces;
a loading element having a first surface and a second surface, the first surface disposed with a protrusion portion and having a top surface and two first datum planes, the top surface being perpendicular to the two first datum planes, the two first datum planes disposed to a side wall of the protrusion portion, the second surface disposed with a connection portion, the connection portion connected to an optical element; and
an switching element movably assembled to the base and having a third surface, a fourth surface and two second datum planes, the third surface flattened against the plurality of loading surfaces and being perpendicular to the two second datum planes, the fourth surface disposed with a notch corresponding to the protrusion portion, a side wall of the notch disposed with two first leaning surfaces, the protrusion portion of the loading element inserted into the notch, and the two first datum planes flattened against the two first leaning surfaces, the top surface flattened against a bottom surface of the notch to movably assemble at the switching element, the two second datum planes disposed to a side wall of the switching element, the two second datum planes respectively and flattened against the two bearing surfaces;
wherein the switching element and the base are performed precision adjustment by movably assembling at least one adjustment gasket.

6. The optical element adjustment mechanism as recited in claim 5, wherein the two second datum planes are respectively parallel to the two leaning surfaces and the third surface is parallel to the plurality of loading surfaces.

7. The optical element adjustment mechanism as recited in claim 5, wherein the two first datum planes are respectively parallel to the two first leaning surfaces and the top surface is parallel to the bottom surface of the notch.

8. The optical element adjustment mechanism as recited in claim 5, wherein the plurality of loading surfaces are respectively disposed with a first through hole, and the switching element is disposed with a plurality of first bolting holes corresponding to the first through hole and bolted by a bolt element.

9. The optical element adjustment mechanism as recited in claim 5, wherein the switching element is disposed with a plurality of second bolting holes corresponding to the two first leaning surfaces and bolted by a bolt element respectively such that the loading element may tightly leans against the two first leaning surfaces of element.

10. The optical element adjustment mechanism as recited in claim 9, wherein the notch is disposed with a plurality of second through holes, and the protrusion portion of the loading element is disposed with a plurality of third bolting holes corresponding to the plurality of second through holes and bolted by the bolt element respectively.

11. The optical element adjustment mechanism as recited in claim 5, wherein the at least one adjustment gasket is individually or simultaneously placed between the third surface and the plurality of loading surfaces.

12. The optical element adjustment mechanism as recited in claim 5, wherein the at least one adjustment gasket is individually or simultaneously placed between the two leaning surfaces and the two second datum planes.

* * * * *